United States Patent [19]

Reichman

[11] Patent Number: 4,908,584

[45] Date of Patent: Mar. 13, 1990

[54] SPATIAL LIGHT MODULATOR USING SURFACE STATE PHOTODIODES

[75] Inventor: Joseph Reichman, Roslyn Estates, N.Y.

[73] Assignee: Grumman Aerospace Corporation, Bethpage, N.Y.

[21] Appl. No.: 203,372

[22] Filed: Jun. 7, 1988

[51] Int. Cl.⁴ .................. G02F 1/13; H01J 31/50
[52] U.S. Cl. ........................... 330/4.3; 350/342
[58] Field of Search ............ 332/7.51; 350/342, 357; 429/111; 357/30

[56] References Cited

U.S. PATENT DOCUMENTS

| | | | |
|---|---|---|---|
| 3,958,207 | 5/1976 | Tutihasi | 350/342 |
| 4,093,852 | 6/1978 | Olive et al. | 250/213 A |
| 4,114,991 | 9/1978 | Bleha et al. | 350/342 |
| 4,127,322 | 11/1978 | Jacobson et al. | 350/342 |
| 4,191,454 | 3/1980 | Braatz et al. | 350/342 |
| 4,198,647 | 4/1980 | Grinberg et al. | 350/342 |
| 4,672,014 | 6/1987 | Loives et al. | 350/342 |

OTHER PUBLICATIONS

Howard et al., "Photoconductor–Liquid Crystal Display Cell . . . ", IBM Tech. Disc. Bull., vol. 19, #6, pp. 2266–2267, 11/76.

Primary Examiner—Nelson Moskowitz
Attorney, Agent, or Firm—Pollock, VandeSande & Priddy

[57] ABSTRACT

A surface state photodiode is used as the photosensitive element for a Spatial Light Modulator, which includes a liquid crystal layer. The surface of the photodiode which faces the liquid crystal layer has formed thereon surface states, by means of adsorption of foreign molecules to create a depletion layer, thereby effecting a high dark impedance region. Such a Spatial Light Modulator provides for a high resolution image and simplicity in manufacture.

10 Claims, 3 Drawing Sheets

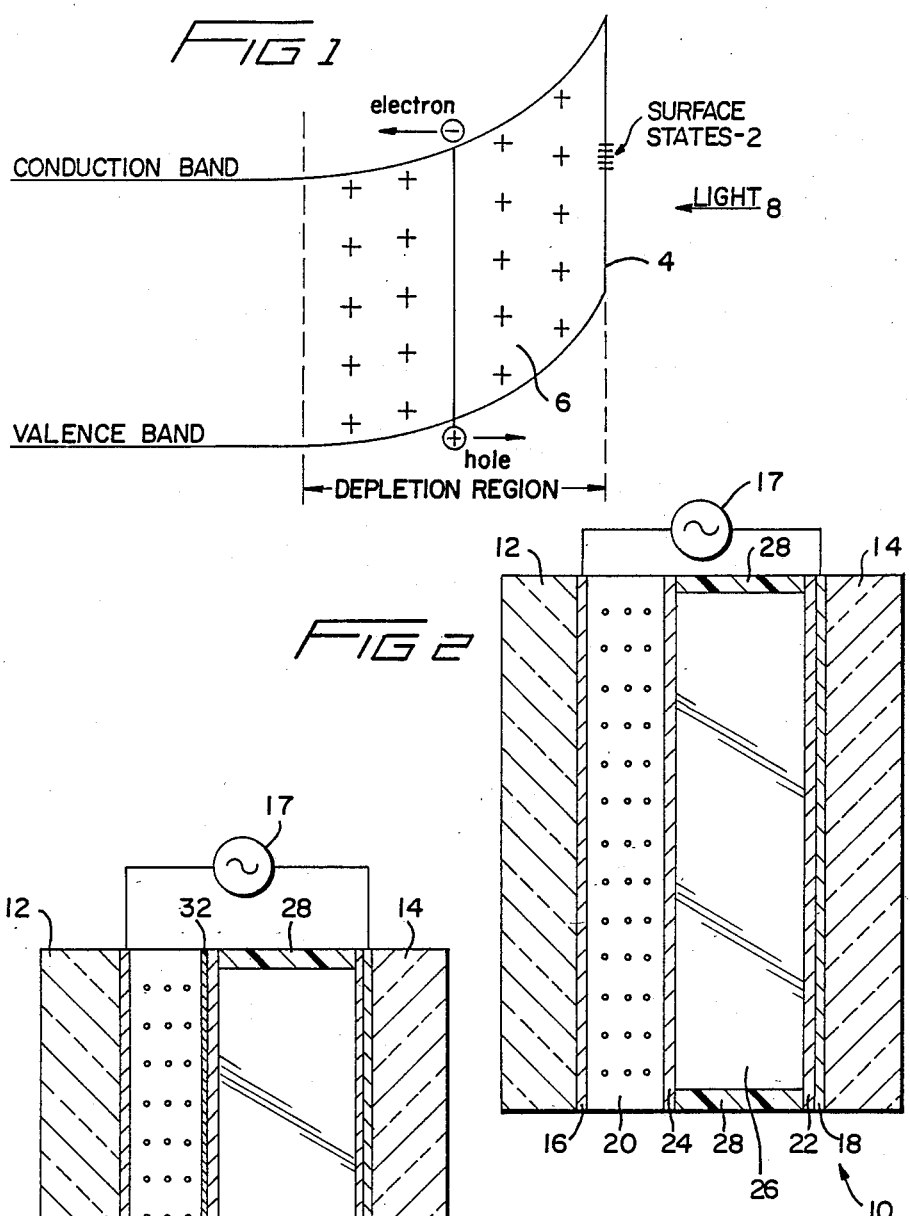

SPATIAL LIGHT MODULATOR USING SURFACE STATE PHOTODIODES

FIELD OF THE INVENTION

The present invention relates to Spatial Light Modulators, and more particularly to a Spatial Light Modulator utilizing a surface state photodiode as its photosensitive layer.

BACKGROUND OF THE INVENTION

Spatial Light Modulators are key components in optical data processing systems and in projection displays. They may be used, for example, to record information from optical signals by converting the same into coherent light distributions. Conventionally, the photosensitive layer of a Spatial Light Modulator is made of either heterojunction or homojunction photodiodes or photoconductors. An electro-optic layer of a typical Spatial Light Modulator often consists of a liquid crystal layer utilized in the twisted nematic mode, birefringent mode, or dynamic scattering mode. A Spatial Light Modulator of this type is often referred to as a "Liquid Crystal Light Valve."

In order to obtain better performance characteristics by increasing the impedance of the photoactive layer of the Spatial Light Modulators, before the instant invention, multilayers of thin films are used. For example, a two layer thin film structure consisting of ZnS and CdS is disclosed in U.S. Pat. No. 3,732,429 as necessary to obtain a sufficiently high dark impedance, in order to obtain a good impedance match to the liquid crystal layer for good performance when activated with light. Another method of impedance matching is described in U.S. Pat. No. 3,824,002 where a heterojunction of CdS and CdTe is used as the photosensitive layer. Yet another method of obtaining a high impedance photoactive layer is given in U.S. Pat. No. 4,206,979 where a multilayer heterojunction photodiode consisting of alternating layers of n-CdS and p-CdS:Cu is employed.

SUMMARY OF OBJECTIVE OF THE PRESENT INVENTION

The present invention is an improvement of an optically addressed Spatial Light Modulator which utilizes a surface state photodiode as its photsensitive layer. The uniqueness of the present invention comes about from the development and use of a surface state photodiode rather than the conventional photoconductor or homojunction/heterojunction photodiode. The surface state photodiode is made by depositing a thin film of a semiconducting compound such as cadmium sulfide or cadmium sulfoselenide on a transparent conducting substrate. A photodiode is formed by creating surface states at the semiconductor surface by the adsorption of nonindigenous atoms. These surface states trap majority carriers and thus create a depletion layer adjacent to the surface, thereby effecting a film with a very high resistance and thus giving a good impedance match to the electro-optic layer which normally has a high impedance. The thus discussed surface state photodiode requires only one layer of thin film. Therefore, the present invention Spatial Light Modulator offers advantages in simplicity of fabrication, reproduceability and performance.

It is, therefore, an objective of the present invention to provide for an easily fabricated Spatial Light Modulator that has a surface state photodiode as its photosensitive layer.

The above-mentioned objects and advantages of the present invention will become more apparent and the invention itself will be best understood by reference to the following description of embodiments of the invention taken in conjunction with the accompanying drawings wherein:

BRIEF DESCRIPTION OF THE DRAWINGS

FIG. 1 is a schematic diagram for explaining the concept of a surface state photodiode;

FIG. 2 is a cross-sectional view of a first embodiment of the present invention Spatial Light Modulator;

FIG. 3 is a cross-sectional view of another embodiment of the present invention Spatial Light Modulator;

DETAILED DESCRIPTION OF THE PRESENT INVENTION

Figure 4:
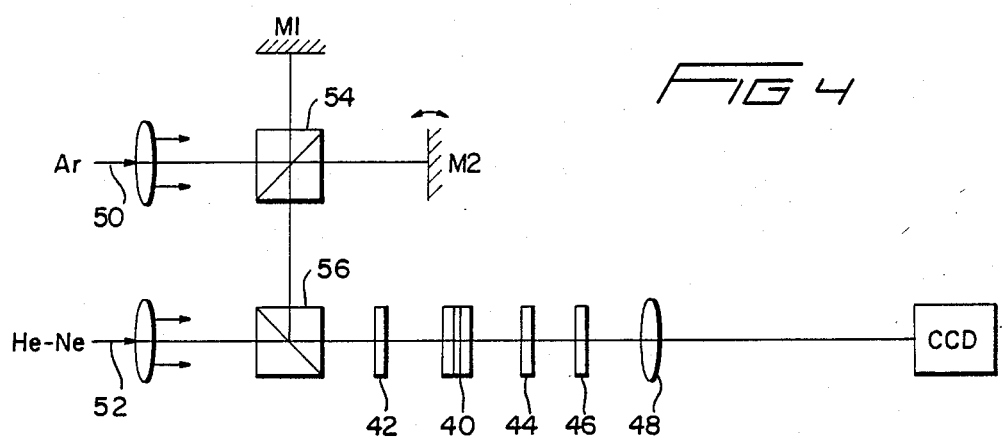
FIG. 4 illustrates in simple block diagram format a system for measuring the sensitivity of a present invention Spatial Light Modulator.

The importance of a high dark impedance for the photosensitive layer of a Spatial Light Modulator cannot be overemphasized. In general, the higher the dark impedance, the less light is required to activate the electrode-optic layer of the Spatial Light Modulator. Thus, the ability to modulate a read light beam by low light level write beams is directly determined by the magnitude of the dark impedance. The semiconductors which make up the photosensitive layer are often binary compounds or ternary alloys formed from groups II and VI or groups III and V of the periodic chart, deposited in thin film form by vapor deposition processes. Due to the difficulty in controlling the deposition processes, films of sufficiently high stoichiometry are generally quite difficult to prepare. This results in films with defects such as vacancies and interstitials which act as donors or acceptors that increase the conductivity well beyond the intrinsic limit result from the deposition processes. Often, post processing of the vapor deposited films are needed to increase the resistance of the films. However, these post processing methods oftentimes suffer from a lack of reproduceability and, also, do not provide for a sufficiently high dark impedance.

Surface states are found to exist on practically all semiconductor surfaces. They are generally deleterious to the performance of semiconductor devices and, therefore, efforts have been made to minimize them. The instant invention, however, in contrast to conventional wisdom, is based on the idea of utilizing a photodiode which is created by surface states on the surface adjacent to the electro-optic layer, i.e. the liquid crystal layer, but is electrically connected in series therewith.

For the present invention photodiode, these surfaces states produce a depletion region adjacent to the semiconductor surface, thereby effecting a high impedance and thereby significantly increasing the overall impedance of the photosensitive layer which in this instance is the surface state photodiode. So, too, the photodiode layer is made more photosensitive inasmuch as write light can be made to directly illuminate the depletion region, as there is no intervening absorbing material present, as, for example, in the case of a heterojunction photodiode. The charge carriers produced in the depletion region are more likely to escape recombination losses than carriers that are generated in the bulk region of the semiconductor. This phenomenon is a result of the high electric field that exists in the depletion region due to space charge. As is well known, the electric field separates the photo-generated electron-hole pairs and thus prevents recombination and thereby improves the sensitivity. Additionally, spatial resolution which is limited by lateral diffusion of charge carriers also improves, due to the electric field assisted transport of photo-generated charge normal to the surface when carriers are generated in the depletion region. To summarize, creation of a depletion region at the surface of a surface state photodiode via surface states results in improved sensitivity and resolution of the Spatial Light Modulator.

The concept of a surface state photodiode is explained with FIG. 1, which shows an energy diagram of an n-type semiconductor. As shown, surface states 2 are located at surface 4 of the semiconductor at energy levels within the bandgap. These surface states 2 act as acceptors and serve to trap majority carrier electrons at the surface. To maintain charge neutrality, an equal and opposite space charge (depletion) region comprised of positively charged donor atoms exists in a layer 6 adjacent to surface 4. Imaging light 8, having sufficiently high photon energy to excite electrons from the valence band to the conduction band, is incident directly onto the near surface space charge (depletion) layer. The generated electron-hole pairs are separated by the built-in electric field due to the space charge. Holes are directed to the surface where they recombine with the electrons that were trapped by the surface states, thereby resulting in a shrinking of the depletion layer, since there is less charge compensation. The impedance is thus reduced, due to the increase of the space charge region capacitance. Additional impedance reduction results from the photo-generation of electron-hole pairs in the bulk of the semiconductor thin film due to increased charge carrier density.

Referring to FIG. 2, an embodiment of a transmissive Spatial Light Modulator 10 having a surface state photodiode as its photosensitive layer is shown in cross-section. It should be noted that Spatial Light Modulator 10 is not drawn to scale. As shown, the various layers are sandwiched between two glass cover plates 12 and 14. On the inner surfaces of the respective plates are transparent conductive thin films 16 and 18, typically made of Indium Tin Oxide, acting as electrodes. Electrode 16 is coated with a thin film photodiode 20, which may be made from cadmium sulfide or cadmium sulfoselenide. The opposing surfaces of layers 18 and 20 are coated with thin insulating alignment layers 22 and 24, respectively, of liquid crystal alignment materials such as polyimide or silicon monoxide. A liquid crystal layer 26 is interposed between alignment layers 22 and 24 in a space maintained by spacers 28. It should be appreciated that an electro-optic layer can take the place of liquid crystal layer 26. However, it should also be appreciated that were an electro-optic layer used in place of a liquid crystal layer, no alignment layers such as 22 and 24 are required. A voltage source 17 supplies ac voltage to electrodes 16 and 18 via contacts placed thereon.

The electro-optic effect of a Spatial Light Modulator 10 is a function of the type of liquid crystal layer 26 and the orientation of the molecules of the liquid crystal, as determined by surface alignment layers 22 and 24. For example, for nematic liquid crystals of positive dielectric anisotropy, by orienting the molecules of the liquid crystals parallel to the surface and at 90° to each other, the well known twisted nematic configuration will result. This configuration will cause rotation of the polarization axis of linearly polarized incident light. When imaging (write) light is incident onto surface state photodiode 20, the impedance of photodiode 20 decreases, thereby effecting an increase of the voltage across liquid crystal layer 26. This increase in voltage tends to untwist the twisted nematic liquid crystals so as to decrease the amount of rotation experienced by the incoming linearly polarized read light. For the FIG. 2 transmissive Spatial Light Modulator, both the imaging light and the read light may be incident onto photodiode 20 from either directions, i.e. from glass plate 14 or glass plate 12.

For the FIG. 2 Spatial Light Modulator, where an analyzer is properly oriented and placed in the path of the output read beam, the amount of readout light transmitted will be proportional to the amount of write light incident onto photodiode 20. Thus when an image is focused onto photodiode 20, the intensity variations thereof are transferred to the output read light thereby reproducing the input image. It must be noted that since the readout light passes through photodiode 26, it must be in a wavelength region to which the photodiode is not sensitive. For a CdS photodiode, the readout light wavelength must be greater than 600 nanometers.

A reflective Spatial Light Modulator which utilizes a surface state photodiode is illustrated cross-sectionally in FIG. 3. The components for Spatial Light Modulator 30 which are the same as those of Spatial Light Modulator 10 have been labelled the same. As shown, the only difference between reflective Spatial Light Modulator 30 and transmissive Spatial Light Modulator 20 of FIG. 2 is the addition of a dielectric mirror coating 32 between alignment layer 24 and the photodiode layer 20.

Dielectric mirror coating 32 may be made up of alternating layers of high and low index of refraction materials and can be tuned by controlling the thickness thereof so as to reflect light in the desired wavelength band. For the FIG. 3 reflective Spatial Light Modulator 30, read light beam 36 is incident onto glass plate 14 and is modulated by liquid crystal layer 26, reflected by mirror coating 32, and further modulated as it passes back through layer 26. Imaging write light 34 can be incident onto glass plate 14 and pass through liquid crystal layer 26 and the dielectric mirror coating 32 to image directly onto the depletion region of surface state photodiode 20. This imaging by imaging light 34 is made possible since no blocking light layer is used and mirror coating 32 can be designed to reflect only in the narrow wavelength band of read light 36.

A process that the inventor has found to be successful in producing good quality surface state photodiodes is described hereinbelow. The basic idea is to create surface states, by adsorption of atoms at the semiconductor surface with the appropriate carrier trapping properties, to create a depletion region. To achieve this end, a cadmium sulfide semiconductor thin film is used. The atomic species adsorbed at the surface is oxygen. The thin film is produced by vacuum co-evaporation of the elements cadmium and sulfur. Best results are achieved by heating the substrate to a temperature between 150° C. and 200° C. An excess of sulfur is to be used during the deposition, with a sulfur to cadmium atomic ratio greater than 2 giving the thin film good stoichiometry. Films with poor stoichiometry will result in too high a sulfur vacancy concentration resulting in a narrow depletion width thereby reducing the dark impedance. The deposition of the thin film is done on a thoroughly cleaned substrate of glass coated with a transparent conductor.

After its removal from the vacuum chamber, the substrate is placed in a furnace at a temperature of approximately 300° C. To obtain best results, a pure oxygen atmosphere, rather than air, is used. After the film has been heat treated to obtain the surface states due to oxygen adsorption, the Spatial Light Modulator is then assembled.

To fabricate a transmissive twisted nematic mode device, polyimide alignment layers are directly applied to a surface of the surface state photodiode and a surface of the other electrode positioned opposite to the photodiode, using conventional spin coating procedures. The two surfaces are then rubbed in directions 90° to each other to obtain alignment of the liquid crystal molecules. The liquid crystal layer is then sandwiched between the electrodes, using spacers to obtain the proper thickness. After sealing and putting electrical contacts onto the electrodes, the modulator is ready for testing.

Verification of the existence of a surface state photodiode can be obtained by performing photovoltage measurements, as was done by the inventor. When the instant invention Spatial Light Modulator was excited from either side with green light, photovoltages were obtained, varying in magnitude from 0.3 to 0.6 volts, depending on the illumination intensity. When blue light was used, a photovoltage was only obtained when the light was incident onto the surface state photodiode from the liquid crystal layer side of the Spatial Light Modulator. This indicates that the depletion layer is formed at the surface of photodiode 20 (FIG. 2) rather than at the interface between transparent conductor 24 and the CdS photodiode 20, since, in the blue region of the spectrum, the absorption coefficient of CdS is sufficiently high such that absorption would take place within a tenth of a micron from the interface. The presence of a photovoltage when green light is incident from either side of the Spatial Light Modulator is explained by a lower absorption coefficient which enables light to reach the surface depletion layer of the surface state photodiode when it is being illuminated from its other side. Since the CdS photodiode thin film 20 is homogenous and is coated with an electrically insulating layer, the appearance of a photovoltage is direct evidence of a surface space charge layer. Additional evidence for photodiode behavior is the observation of rectifying behavior when the alignment layer adjacent to the surface state photodiode is made sufficiently thin to allow for tunneling. The magnitude of the reverse current is a function of the light intensity, showing typical photodiode response behavior.

The use of a surface state photodiode as the photosensitive component in a Spatial Light Modulator leads to a high sensitivity device. A schematic for measuring the sensitivity of a thus constructed Spatial Light Modulator is shown in FIG. 4. As illustrated, Spatial Light Modulator 40, in this instance a transmissive type surface state photodiode Spatial Light Modulator, is placed between a polarizer 42 and a red filter 44. Behind red filter 44 are respective analyzer 46 and a focusing lens 48. A collimated argon laser beam 50 is used for writing while a collimated He-Ne laser beam 52 is used for reading. Also in the FIG. 4 measuring system are beam splitters 54 and 56, and mirrors M1 and M2.

Figure 5:
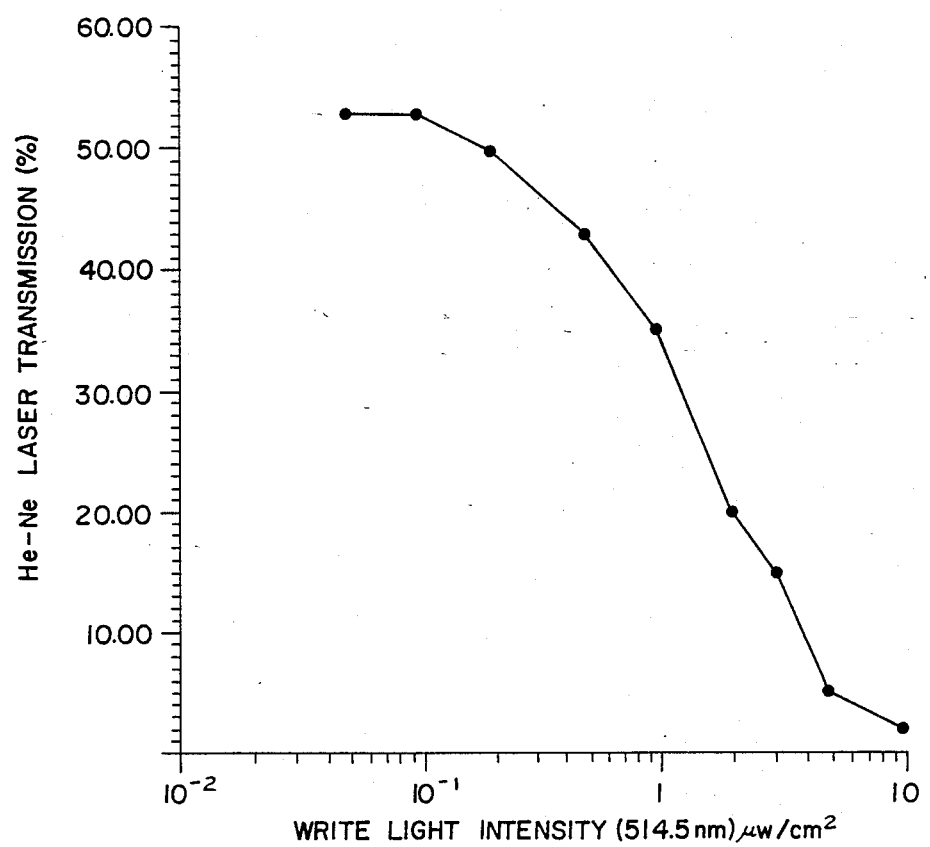
FIG. 5 is a graph showing the measured light intensity of the read light as a function of the write light.

For this measuring system, red filter 44 is used to separate beam 52 from write beam 50. The uniform write argon laser beam 50 is directed onto the Spatial Light Modulator; and the transmission of the read He-Ne laser beam 52 is measured as a function of the intensity of write beam 50. The result of this measurement is shown in FIG. 5, wherein it can be seen that the transmission of the He-Ne laser starts to change at beam intensity of only 0.1 microwatts per square centimeter indicating a high sensitivity.

Figure 6:
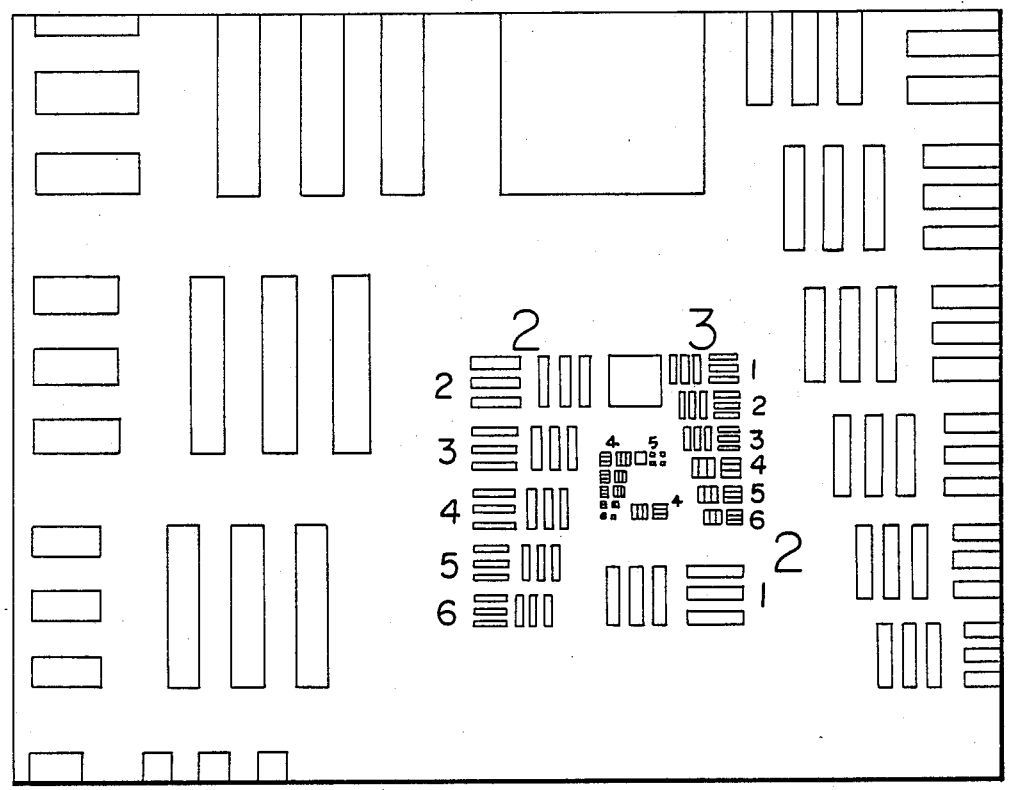
FIG. 6 is a magnified view of the central portion of an example readout image.

The surface state photodiode Spatial Light Modulator is capable of producing images of high resolution. To measure the resolution of such a Spatial Light Modulator, an air force resolution chart is imaged onto Spatial Light Modulator 40, with the He-Ne laser beam 52 being used to read out the image. A magnified view of the central portion is shown in FIG. 6. The ability to resolve the lines of group 5 of the resolution chart indicates a resolution capability of 50 to 60 line pairs per millimeter.

In summation, the inventor has shown that, by using a single layer photodiode as the photosensitive element in a Spatial Light Modulator, performance characteristics that are as good or better than devices that rely on more complex multilayer structures are obtained. The utilization and optimization of surface states to create a depletion layer and thus form a high impedance photodiode is the basis of the invention. It should be appreciated that, previously, surface states have been considered deleterious to the performance of semiconductor devices. Yet for this invention, surface states are deliberately introduced onto a photodiode by adsorption of oxygen atoms at the surface thereof to produce a depletion layer, thereby creating a high dark impedance photodiode.

It should further be appreciated that adsorption of atoms or molecules at the surface of a semiconductor to trap charge carriers and thus create a depletion region is a phenomenon which has been observed in a large number of semiconductors and adsorbing species. Thus, although there has been presented herein only details on the fabrication of a CdS and oxygen semiconductor-adsorbate combination, it should be appreciated that the adsorption of the appropriate species to produce a depletion layer on almost any semiconductor surface can be found. Therefore, the general approach of the instant invention can be used on other semiconductors by using the appropriate adsorption species to produce the appropriate photodiode.

While a preferred embodiment of the invention is disclosed herein for purposes of explanation, numerous changes, modifications, variations, substitutions and equivalents, in whole or in part, should now be apparent to those skilled in the art to which the invention pertains. Accordingly, it is intended that the invention be limited only by the spirit and scope of the appended claims.

I claim:

1. A spatial light modulator, comprising:
   first and second parallel glass plates;
   corresponding transparent electrically conductive layers formed on the inner opposed surfaces of the glass plates;
   an electro-optic layer interposed spatially between the electrically conductive layers;

a surface state photodiode layer positioned between the electro-optic layer and one of the electrically conductive layers, a high dark impedance region whereat substantially all electrons are removed being effected proximate to the surface of the photodiode layer facing the electro-optic layer by adsorption of nonindigenous atoms or molecules as surface states on the surface of the photodiode layer facing the electro-optic layer;

wherein, when a read light and an imaging light are incident onto the surface state photodiode layer and a voltage is applied to the electrically conductive layers, an optical image of an object focused onto the spatial light modulator by the imaging light is outputted from the spatial light modulator by the read light, the intensity of the outputted read light being proportional to the amount of imaging light incident onto the surface state photodiode layer.

2. The spatial light modulator according to claim 1, wherein the electro-optic layer comprises a liquid crystal layer.

3. The spatial light modulator according to claim 2, further comprising:
a first alignment layer sandwiched between the liquid crystal layer and the electrically conductive layer adjacent thereto; and
a second alignment layer sandwiched between the liquid crystal layer and the surface state photodiode layer.

4. The spatial light modulator according to claim 3, wherein the surface state photodiode layer comprises cadmium sulfide.

5. The spatial light modulator according to claim 3, wherein the surface state photodiode layer comprises cadmium sulfoselenide.

6. A method of manufacturing a spatial light modulator, comprising the steps of:
positioning two glass plates in parallel;
forming corresponding transparent electrically conductive layers on the opposed surfaces of the glass plates;
interposing a liquid crystal layer between the electrically conductive layers;
forming by adsorption of nonindigenous atoms or molecules surface states on a surface of a photoactive layer to effect a surface state photodiode layer having a high impedance region whereat substantially all electrons are removed;
interposing the surface state photoactive layer between the liquid crystal layer and one of the electrically conductive layers, the surface of the surface state photoactive layer having the surface states being positioned adjacent to the liquid crystal layer.

7. A method according to claim 6, further comprising the steps of:
sandwiching a first alignment layer between the liquid crystal layer and the electrically conductive layer adjacent thereto; and
sandwiching a second alignment layer between the liquid crystal layer and the photosensitive layer.

8. A spatial layer modulator, comprising:
first and second parallel glass plates;
corresponding transparent electrically conductive layers formed on the inner opposed surfaces of the glass plates;
an electro-optic layer interposed between the conductive layers;
a reflective coating positioned between the electro-optic layer and one of the conductive layers;
a surface state photodiode layer interposed between the reflective coating and the one conductive layer, a high dark impedance region whereat substantially all electrons are removed being formed proximate to the surface of the surface state photodiode adjacent to the reflective coating by adsorption of nonindigenous atoms or molecules, as surface states, on the surface of the surface state photodiode layer adjacent to the reflective coating;
wherein, when an imaging light and a read light are incident onto the surface state photodiode layer, the imaging light focusing an image of an object thereto, the photodiode layer acts as a photosensitive layer for enabling the spatial light modulator to output a high resolution image of the object onto the read light.

9. The spatial light modulator according to claim 8, wherein the electro-optic layer comprises a liquid crystal layer.

10. The spatial light modulator according to claim 9, further comprising:
a first alignment layer sandwiched between the liquid crystal layer and the electrically conductive layer adjacent thereto; and
a second alignment layer sandwiched between the liquid crystal layer and the surface state photodiode layer.

* * * * *